Sept. 16, 1952     DE ELLA B. MAYBERRY     2,610,696
DRAIN TRAP SCRAPING AND CLEANING MEANS
Filed July 29, 1949     3 Sheets-Sheet 1
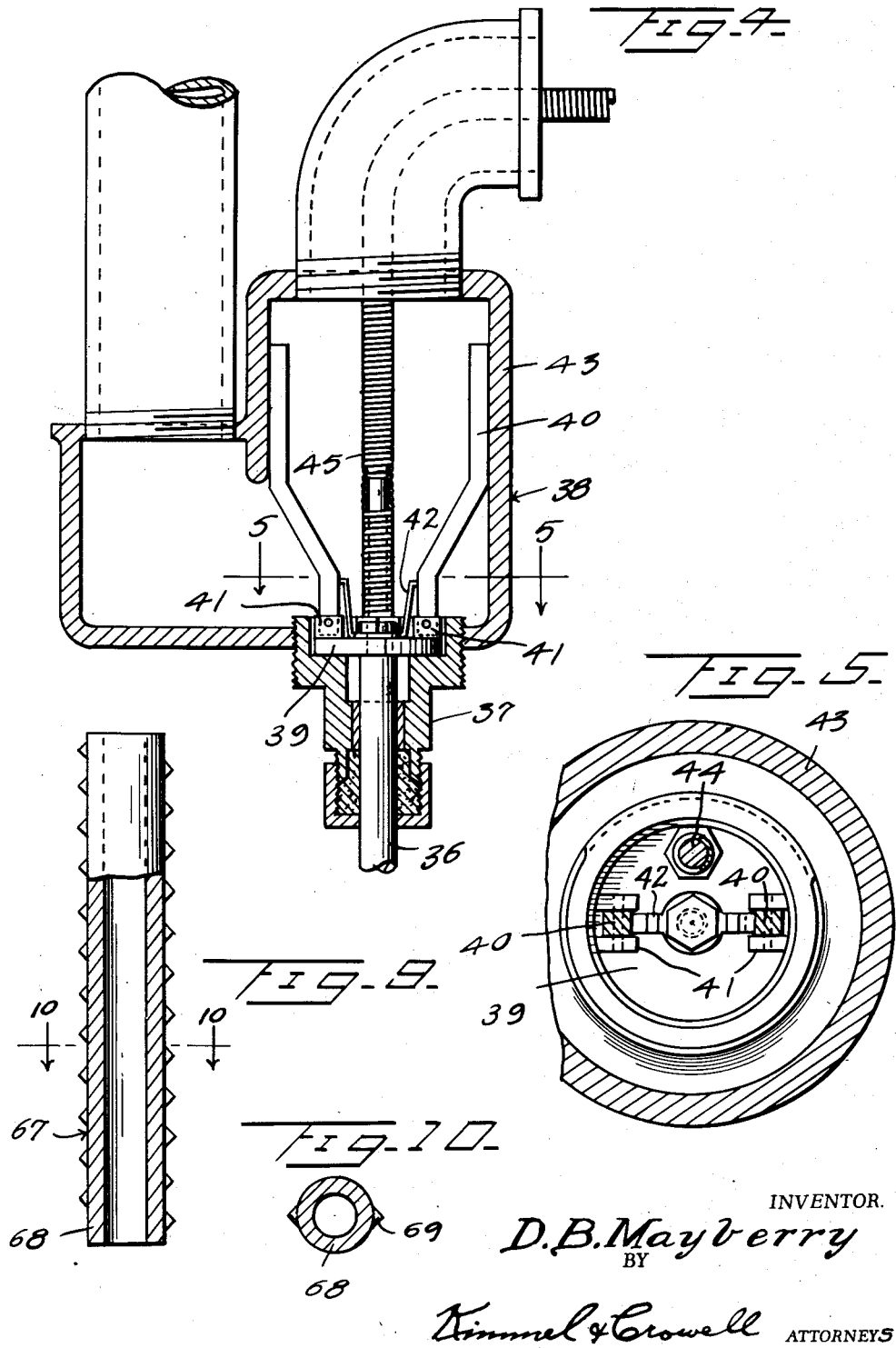
INVENTOR.
D. B. Mayberry
BY
Kimmel & Crowell ATTORNEYS

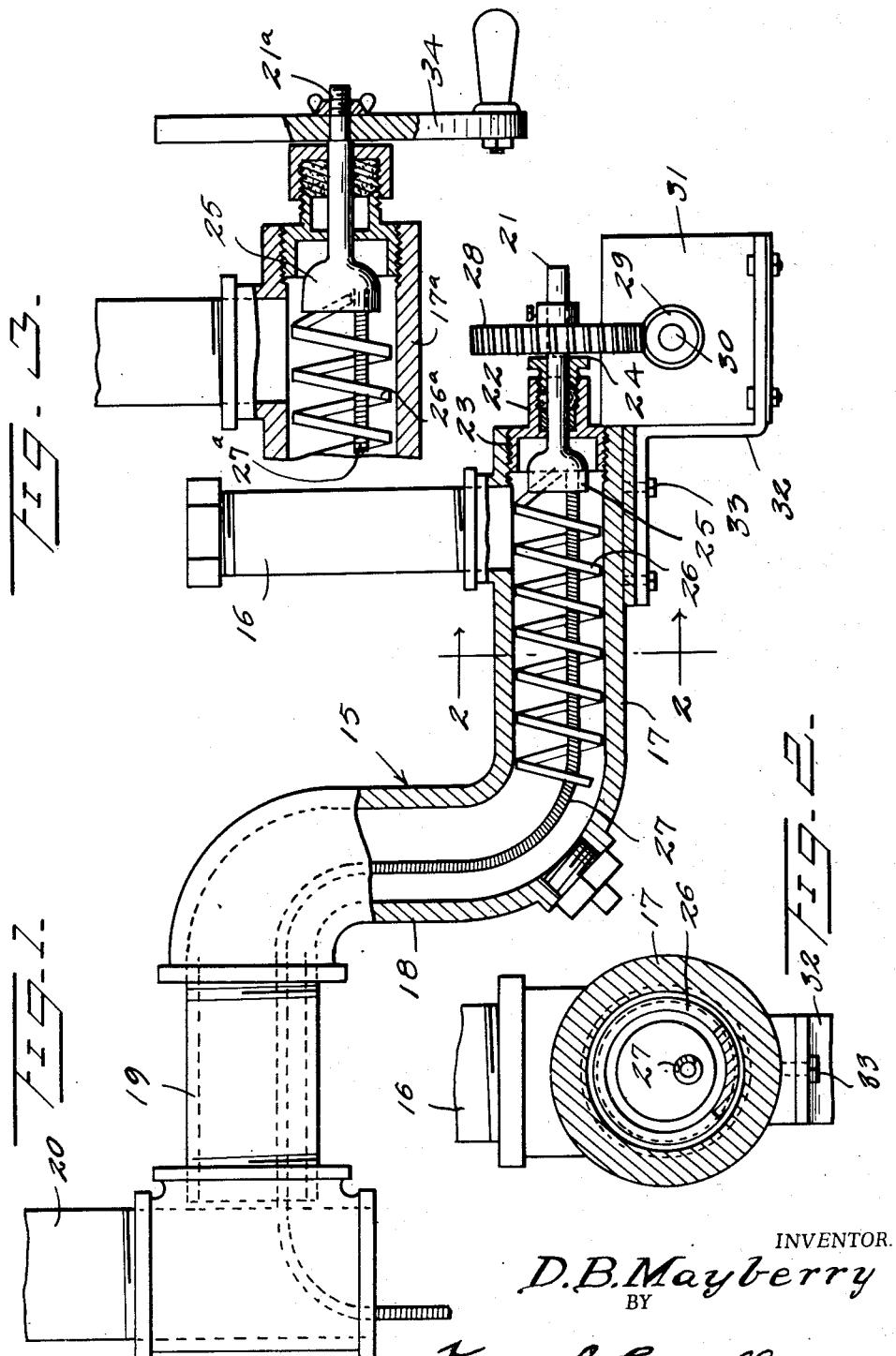

Sept. 16, 1952     DE ELLA B. MAYBERRY     2,610,696
DRAIN TRAP SCRAPING AND CLEANING MEANS
Filed July 29, 1949     3 Sheets-Sheet 3
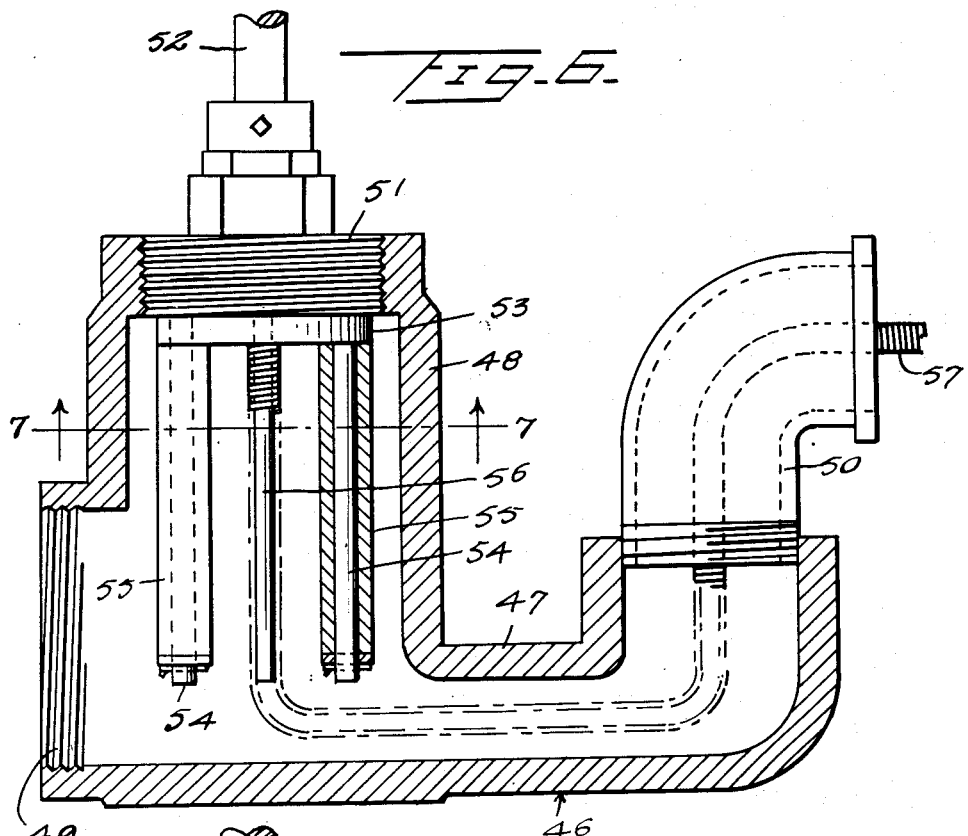
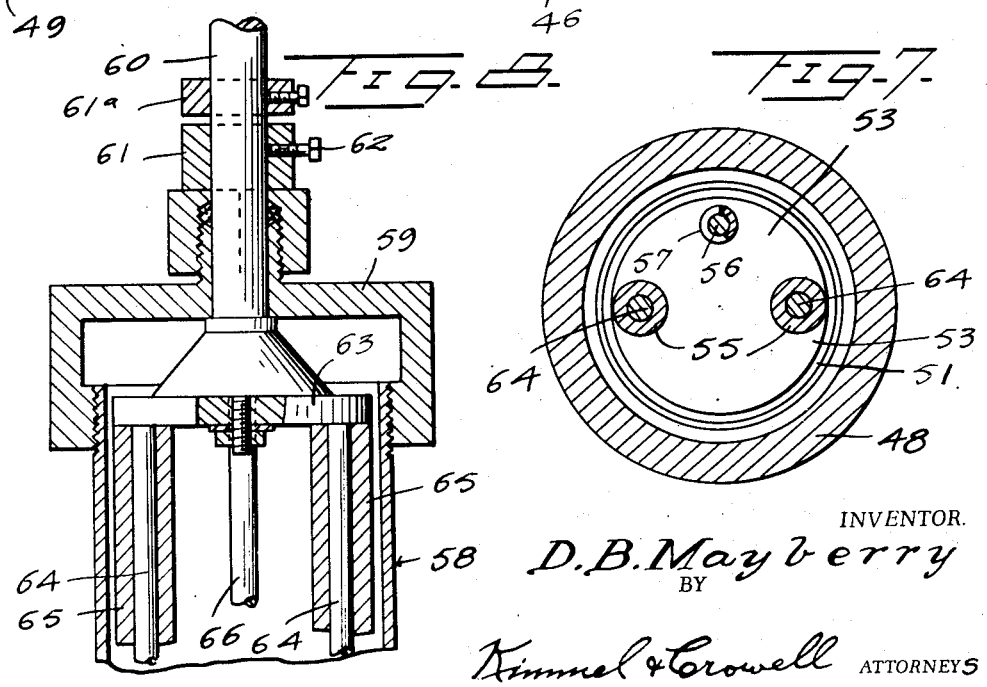
INVENTOR.
D. B. Mayberry
BY
Kimmel & Crowell ATTORNEYS Patented Sept. 16, 1952

2,610,696

UNITED STATES PATENT OFFICE 2,610,696

DRAIN TRAP SCRAPING AND CLEANING MEANS

De Ella B. Mayberry, Detroit, Mich.

Application July 29, 1949, Serial No. 107,542

11 Claims. (Cl. 182—7)

This invention relates to trap cleaning devices.

An object of this invention is to provide a cleaning device for mounting in a trap such as a sink or bathtub trap, so that the trap may be kept clean and waste material prevented from accumulating therein.

In the carrying out of this invention, a rotatable scraping means is mounted in the trap, and a snake or spiral resilient wire is connected to the scraping means for rotation therewith so that the trap properly may be scraped and maintained clean, and a substantial length of the drain pipe beyond the trap may be maintained clean.

In one embodiment of this invention the trap cleaning means is power operated whereas in other embodiments of this invention the device is operated by a hand crank.

A further object of this invention is to provide in a device of this kind means whereby the sludge will not only be loosened but will be moved forwardly to a position where it will be carried forwardly to the main drain.

With the above and other objects in view, my invention consists in the arrangement, combination and details of construction disclosed in the drawings and specification, and then more particularly pointed out in the appended claims.

In the drawings,

Figure 1 is a detail side elevation, partly broken away and in section, of a drain trap cleaning means constructed according to an embodiment of this invention, Figure 2 is a sectional view taken on the line 2—2 of Figure 1, Figure 3 is a fragmentary sectional view similar to Figure 1, showing a modified form of operator for the cleaning means, Figure 4 is a fragmentary vertical section showing another modification of this invention, Figure 5 is a fragmentary sectional view taken on the line 5—5 of Figure 4, Figure 6 is a vertical section, partly broken away, showing another modification of this invention, Figure 7 is a sectional view taken on the line 7—7 of Figure 6, Figure 8 is a fragmentary vertical section showing another modification of this invention, Figure 9 is a detail side elevation, partly broken away and in section, of a further modification of this invention, Figure 10 is a sectional view taken on the line 10—10 of Figure 9.

Referring to the drawings and first to Figures 1 and 2, the numeral 15 designates generally a drain trap embodying a vertically disposed pipe 16 adapted to be connected to the outlet of a sink or the like. The pipe 16 is connected at its lower end to a horizontally disposed casting 17 which is formed with a vertical bend 18 connected by a connecting nipple 19 to a main drain pipe 20.

In order to provide a means whereby the trap which is formed between the pipes 16, 17 and 18 may be kept clean or free from accumulations, I have provided a rotatable shaft 21 which is journalled through a bushing 22 carried by an externally threaded bushing 23 engageable in the outer end of the pipe 17. The shaft 21 is sealed relative to the bushing 22 by means of a sealing gland 24. The inner end of the shaft 21 is formed with a head or enlargement 25 to which is connected the rear end of a spiral cleaning member 26.

The cleaning member 26 is constructed in the form of a spring which is square or round in transverse section and is pitched in a manner to provide a conveying means whereby any adhering material will be moved forwardly within the pipe 17. The forward end of the cleaning member 26 terminates at substantially the junction between the forward end of the horizontal pipe 17 and the vertical extension 18, as shown in Figure 1. An elongated flexible coiled wire 27 is fixed at its outer or rear end to the head 25, at a point offset from the axial center of head 25, and the coil spring or snake 27 is of such length as to extend through the pipes 17 and 18 and the nipple 19, and to also extend downwardly a substantial distance within the main drain pipe 20.

The shaft 21 has fixed thereto a worm gear 28 with which a worm 29 secured to a motor shaft 30 meshes. The shaft 30 is operated by a motor 31 supported by a bracket 32 which is fixed by fastening means 33 to the rear end of the pipe or casting 17.

Referring now to Figure 3, there is disclosed a modified form of the trap cleaning means shown in Figure 1, wherein the shaft 21a has secured thereto a hand crank 34. The shaft 21a has secured to the forward end thereof within the pipe 17a, a head 25a, and a spiral cleaning and conveying member 26a is secured to the head 25a. An elongated resilient wire cleaning member 27a is secured in offset relation to the head 25a in the same manner as the wire cleaning member 27.

Referring now to Figure 4, there is disclosed another modification of this invention, wherein a shaft 36 is journalled in an end plug or bushing 37 which is threaded into the bottom of a trap generally designated as 38. The shaft 36 has fixed to the upper end thereof a plate or head 39, and a pair of upwardly extending cleaning arms 40 are pivotally mounted between pairs of ears 41 which are carried by the plate or head 39. A spring 42 constantly urges the arms 40 outwardly so that these arms will be resiliently held in contact with the vertical wall 43 of the trap 33. The head or plate 39 has fixed thereto an upwardly extending rod 44 about which the rear or lower end of a resilient spiral cleaning member 45 is adapted to engage. The cleaning member 45 is of elongated configuration so as to extend a substantial distance from the trap 38 in order to maintain the sludge or solid matter agitated to permit the carrying away of the heavy material when water is passed through the trap 38.

Referring now to Figures 6 and 7, there is disclosed another modification of this invention which is mounted in a trap generally designated as 46. The bath trap 46 is of slightly different configuration than the previously disclosed traps and includes a horizontally disposed pipe or tube 47 which is formed with an upwardly offset boss 48. The tube 47 is provided with a threaded intake 49, and an upwardly and laterally directed L 50 extends from the discharge end of the pipe or tube 47. A threaded bushing 51 is threaded into the boss 48 and has journalled therethrough a shaft 52 which is formed at its lower end with a head or plate 53. A pair of depending rods 54 are fixedly carried by the plate or head 53 and a pair of cleaning rollers 55 are rotatably carried by the rods 54. A depending rod 56 is also fixed to the plate or head 53 and the upper or rear end of an elongated spiral cleaning member 57 is fixed about the rod 56 and extends through the trap 46 to a point located substantially remote from the trap 46.

Referring now to Figure 8, there is disclosed a further modification of this invention wherein the trap 58 has secured to the upper end thereof a cap 59 through which a shaft 60 is journalled. A collar 61 is secured by fastening means 62 to the shaft 60, and the inner or lower end of the shaft 60 has fixed thereto a plate or disc 63. A second collar 61a is secured to shaft 60 for securing an extension to the shaft. A pair of depending rods 64 are fixed to the plate or disc 63 and a roller 65 is rotatably disposed about each rod 64. A rod 66 is also fixedly carried by the plate or head 63 and the upper or rear end of a coiled cleaning member similar to member 57 is adapted to tightly engage about rod 66.

Referring now to Figures 9 and 10, there is disclosed a modified form of roller for use on the forms of the invention shown in Figures 6 and 8. In place of the smooth surface rollers 55 and 65 disclosed in Figures 6 and 8 respectively, a toothed roller 67 may be used on the rods 54 and 64. The toothed roller 67 includes a cylindrical body 68 which is formed with a plurality of longitudinally spaced apart staggered teeth or points 69. The points or teeth 69 are provided so that the adhering solid material will be readily broken up upon rotation of roller 68 within the trap.

In the use and operation of this device, the device shown in Figure 1 is connected to a drain trap and the motor 31 is connected to a source of electric current supply, and if desired a flow operated or pressure switch may be interposed between the motor 31 and the supply source so that motor 31 will be operated whenever water is discharged from a tap into the sink. When motor 31 is connected with the supply source, shaft 21 will rotate so as to rotate spiral cleaning member 26 and flexible or resilient cleaning member 27. The shaft 21 will rotate in a clockwise direction, as viewed in Figure 1, in order that the cleaning member 26 will force the material to the left or forwardly in the trap.

The device shown in Figure 3 will operate in the same manner as that shown in Figure 1, with the exception that the device is manually operated by turning the hand crank 34.

The device shown in Figure 4 may be either motor operated or manually operated. Rotation of shaft 36 will cause the cleaning members 40 to scrape the vertical cylindrical wall of trap 38 so that the force of the liquids flowing through trap 38 will carry any adhering or coagulating material outwardly of the trap 38.

I do not mean to confine myself to the exact details of construction herein disclosed, but claim all variations falling within the purview of the appended claims.

What I claim is:

1. A built-in cleaning means for a drain trap having an aperture in a wall thereof, said means comprising a sealing bushing adapted to be inset in said aperture, a shaft extending through said bushing, means for rotating said shaft, a disc carried by the inner end of said shaft for rotation thereby, an elongated flexible coiled wire secured at one end to a peripheral point in said disc for eccentric rotation by said disc and a scraper and agitating element carried by a second peripheral point on said disc and rotatable therewith.

2. A built-in cleaning means for a drain trap having an aperture in a wall thereof, said means comprising a sealing bushing adapted to be inset in said aperture, a shaft extending through said bushing, means for rotating said shaft, a disc carried by the inner end of said shaft for rotation thereby, an elongated flexible coiled wire secured at one end to a peripheral point in said disc for eccentric rotation by said disc and a scraper and agitating element carried by a second peripheral point on said disc and rotatable therewith, said scraping and agitating element comprising a helical spring.

3. A built-in cleaning means for a drain trap having an aperture in a wall thereof, said means comprising a sealing bushing adapted to be inset in said aperture, a shaft extending through said bushing, means for rotating said shaft, a disc carried by the inner end of said shaft for rotation thereby, an elongated flexible coiled wire secured at one end to a peripheral point in said disc for eccentric rotation by said disc and a scraper and agitating element carried by a second peripheral point on said disc and rotatable therewith, said scraper and agitating element comprising a shaft fixed on said disc, and a roller on said shaft.

4. A built-in cleaning means for a drain trap having an aperture in a wall thereof, said means comprising a sealing bushing adapted to be inset in said aperture, a shaft extending through said bushing, means for rotating said shaft, a disc carried by the inner end of said shaft for rotation thereby, an elongated flexible coiled wire secured at one end to a peripheral point in said disc for eccentric rotation by said disc and a scraper and agitating element carried by a second peripheral point on said disc and rotatable therewith, said scraper and agitating element comprising a shaft fixed on said disc, a roller on said shaft, and teeth on the periphery of said roller.

5. A built-in cleaning means for a drain trap having an aperture in a wall thereof, said means comprising a sealing bushing adapted to be inset in said aperture, a shaft extending through said bushing, means for rotating said shaft, a disc carried by the inner end of said shaft for rotation thereby, an elongated flexible coiled wire secured at one end to a peripheral point in said disc for eccentric rotation by said disc and a scraper and agitating element carried by a second peripheral point on said disc and rotatable therewith, and scraper and agitating element comprising a pair of opposed pivotally mounted blocks and springs carried by said disc biasing said blades outwardly.

6. In combination with a drain trap having an aperture in a wall thereof, a bushing in said aperture, a shaft extending through said bushing, sealing means for said shaft, means for rotating said shaft, a disc secured to the inner end of said shaft, a flexible elongated cleaning member secured at one end to a peripheral point on said disc extending into and through said drain and a scraping and a relatively inflexible agitating element secured to said disc.

7. In combination with a drain trap having an aperture in a wall thereof, a bushing in said aperture, a shaft extending through said bushing, sealing means for said shaft, means for rotating said shaft, a disc secured to the inner end of said shaft, a flexible elongated cleaning member secured at one end to a peripheral point on said disc extending into and through said drain and a scraping and a relatively inflexible agitating element secured to said disc, said cleaning member comprising a tightly coiled wire.

8. In combination with a drain trap having an aperture in a wall thereof, a bushing in said aperture, a shaft extending through said bushing, sealing means for said shaft, means for rotating said shaft, a disc secured to the inner end of said shaft, a flexible elongated cleaning member secured at one end to a peripheral point on said disc extending into and through said drain and a scraping and a relatively inflexible agitating element secured to said disc, said scraper and agitating element comprising a helical spring.

9. In combination with a drain trap having an aperture in a wall thereof, a bushing in said aperture, a shaft extending through said bushing, sealing means for said shaft, means for rotating said shaft, a disc secured to the inner end of said shaft, a flexible elongated cleaning member secured at one end to a peripheral point on said disc extending into and through said drain and a scraping and a relatively inflexible agitating element secured to said disc, said scraper and agitating element comprising a shaft fixed on said disc, and a roller on said shaft.

10. In combination with a drain trap having an aperture in a wall thereof, a bushing in said aperture, a shaft extending through said bushing, sealing means for said shaft, means for rotating said shaft, a disc secured to the inner end of said shaft, a flexible elongated cleaning member secured at one end to a peripheral point on said disc extending into and through said drain and a scraping and a relatively inflexible agitating element secured to said disc, said elements comprising a shaft fixed to a peripheral point of said disc, and a roller on said last-mentioned shaft and teeth on the periphery of said roller.

11. In combination with a drain trap having an aperture in a wall thereof, a bushing in said aperture, a shaft extending through said bushing, sealing means for said shaft, means for rotating said shaft, a disc secured to the inner end of said shaft, a flexible elongated cleaning member secured at one end to a peripheral point on said disc extending into and through said drain and a scraping and a relatively inflexible agitating element secured to said disc, said scraper and agitating element comprising a pair of opposed pivotally mounted blades and springs carried by said disc biasing said blades outwardly.

DE ELLA B. MAYBERRY.

REFERENCES CITED

The following references are of record in the file of this patent:

UNITED STATES PATENTS

| Number | Name | Date |
|---|---|---|
| 1,090,059 | Hill | Mar. 10, 1914 |
| 1,221,984 | Froussard | Apr. 10, 1917 |
| 2,039,467 | Walsh | May 5, 1936 |
| 2,182,680 | Rugg et al. | Dec. 5, 1939 |
| 2,278,067 | Emery | Mar. 31, 1942 |
| 2,345,603 | Houdry et al. | Apr. 4, 1944 |
| 2,454,884 | Peaden | Nov. 30, 1948 |